Oct. 8, 1929.  J. A. VALIGA  1,730,957
FISHHOOK
Filed July 30, 1928
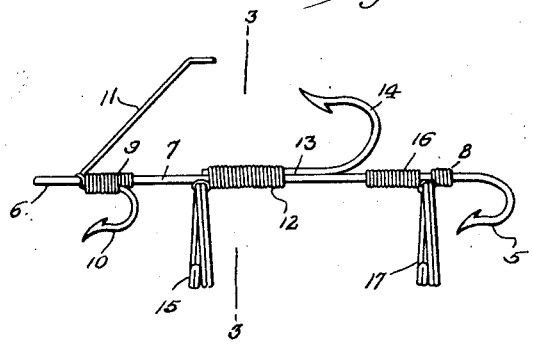
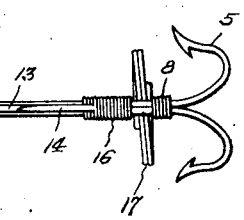
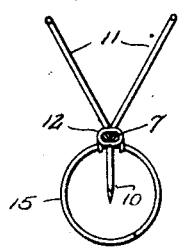
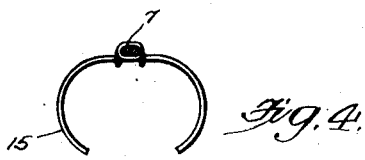
Inventor
J. A. Valiga,
By Clarence A. O'Brien
Attorney Patented Oct. 8, 1929

1,730,957

UNITED STATES PATENT OFFICE

JOHN A. VALIGA, OF PHILLIPS, WISCONSIN

FISHHOOK

Application filed July 30, 1928. Serial No. 296,246.

The present invention relates to fish hooks of a type employing the use of live bait as a lure and has for its principal object to provide means carried by the hook for retaining the lure in a predetermined position upon the hook.

A still further object is to form such retaining means in such a manner as to not cause injury to the live bait.

A still further object is to provide an article of this character of simple and practical construction, which is strong and durable, efficient in operation, relatively inexpensive to manufacture and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout and in which:

In the drawings:

Figure 1 is a side elevational view of the hook constructed in accordance with my invention, Figure 2 is a top plan view, Figure 3 is a transverse sectional view taken substantially along a line 3—3 of Figure 1, and Figure 4 is a similar view showing the fish bait retaining means in open position.

Referring now to the drawing in detail, the invention comprises a fish hook composed of a pair of hook members 5 formed at the opposite ends of a single length of material, the intermediate portion of the material being formed into a ring 6, by means of which the fish line is attached to the hook, and the portion of the material between the ring and each hook 5 is disposed in parallel relation against each other to form a shank 7 of the hook.

A pair of hooks 5 are bent downwardly and outwardly away from each other, as clearly illustrated in Figure 2 of the drawing.

The portion of the shank 7 adjacent the hooks 5 and the ring 6 is wrapped with a fine gauge wire as shown at 8 to prevent the spreading apart of the sections forming the shank. The wrapping adjacent the ring 6, indicated at 9 is also used to attach a bait retaining hook 10 disposed at the under side of the hook and also used for securing one end of a pair of guards 11.

The guards 11 are disposed at the upper side of the hook and extend upwardly and rearwardly, with their rear ends diverging as clearly illustrated in Figures 1 and 2 of the drawing. A wrapping 12 is also arranged intermediate the ends of the shank and employed for securing the shank portion 13 of a hook 14 intermediate the ends of the shank and disposed at the upper side thereof.

The wrapping 12 is also utilized for attaching the forward bait clamping member 15 to the under side of the shank 7, said clamping member being composed of a double strand of wire secured intermediate its ends by the wrapping 12 and having its free end bent in semi-circular formation as clearly illustrated in Figures 3 and 4 of the drawings and disposed in overlapping relation with respect to each other so that the clamping member may be disposed about the body of the bait.

The wrapping 16 is also arranged adjacent the rear end of the shank 7 and is utilized for securing a rear bait clamping member 17 of a construction similar to the clamping member 15.

It will be readily understood from the foregoing that the live bait, such as a minnow or the like may be attached to the forward hook 10 and secured in a substantial parallel relation with respect to the shank 7 by means of the clamping members 15 and 17.

It will further be apparent that these clamping members are adapted to suitably embrace the body of the bait without causing injury thereto and at the same time permit a limited movement to cause the luring of the bait.

The guards 11 at the upper side of the hook prevent the approach to the bait from the upper side thereof and necessitates the approach to the bait from the under side within the range of the rear hooks 5.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A fish hook comprising a shank, a main hook at one end of the shank, a bait hook adjacent to the opposite end, a pair of spaced bait clamping members carried by the shank between the main hook and the base hook, each including bendable semi-circular jaw members, with their free ends normally arranged in overlapping relation, and diverging guard members carried by the forward end of the shaft extending rearwardly and upwardly therefrom and terminating beyond the first clamping member.

In testimony whereof I affix my signature.

JOHN A. VALIGA.